United States Patent
Hwang et al.

(10) Patent No.: US 6,198,430 B1
(45) Date of Patent: Mar. 6, 2001

(54) ENHANCED DIFFERENTIAL GNSS CARRIER-SMOOTHED CODE PROCESSING USING DUAL FREQUENCY MEASUREMENTS

(75) Inventors: Patrick A. Hwang, Marion; Gary A. McGraw; John R. Bader, both of Cedar Rapids, all of IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/277,341

(22) Filed: Mar. 26, 1999

(51) Int. Cl.$^7$ .............................. H04B 7/185; G01S 5/02
(52) U.S. Cl. ..................................... 342/357.03; 701/215
(58) Field of Search ........................ 342/357.03; 701/215

(56) References Cited

U.S. PATENT DOCUMENTS 5,323,322 * 6/1994 Mueller et al. .
5,450,448 * 9/1995 Sheynblat .............................. 375/346
5,471,217 * 11/1995 Hatch et al. .

OTHER PUBLICATIONS

Braff, R., "Description of the FAA's Local Area Augmentation System (LAAS)," Navigation: J. Of the Inst. Of Navigation, vol. 44, No. 4, Winter 1997–1998, pp. 411–423.
Doherty, P. et al, "The Spatial and Temporal Variations in Ionospheric Range Delay," in Proc. of The 10*th* Int. Technical Meeting of *The Satellite Div. of The Inst. Navigation*, ION GPS–97, Kansas City, MO, Sep. 16–19, 1997, pp. 231–240.

Goad, C.C., "Optimal Filtering of Pseudoranges," Navigation: J. of the Institute of Navigation, vol. 37, No. 3, Fall 1990, pp. 191–204.

Eueler, H. and Goad, C. C., "On Optimal Filtering of GPS Dual Frequency Observations Without Using Orbit Information", Bulletin Geodesique, vol. 65, No. 2, 1991, pp. 130–143.

Goad, C. C., "Surveying With The Global Positioning System," in Global Positioning System: Theory and Applications vol. II, ed. Parkinson, B. W. and Spilker, J. J., AIAA, 1995.

(List continued on next page.)

*Primary Examiner*—Theodore M. Blum
(74) *Attorney, Agent, or Firm*—Nathan O. Jensen; Kyle Eppele; J. P. O'Shaughnessy (57) ABSTRACT

A method of generating a differentially corrected pseudorange residual in a differential global positioning system includes tracking at a base station first and second GPS signals, having first and second frequencies, from a first satellite. At the base station, a first pseudorange measurement is determined from the tracked first GPS signal. At the base station, a first smoothed pseudorange measurement is calculated from the determined first pseudorange measurement as a function of both the first and second GPS signals. The first smoothed pseudorange measurement is provided to a remote GPS receiver. The remote GPS receiver calculates the differentially corrected pseudorange residual as a function of the first smoothed pseudorange measurement provided by the base station.

19 Claims, 8 Drawing Sheets

OTHER PUBLICATIONS

Hatch, R., "The Synergism of GPS Code and Carrier Measurements," Proceedings of the 3$^{rd}$ Int. Geodetic Symposium of Satellite Doppler Positioning, Las Cruces, NM, Feb. 1982, pp. 1213–1231.

Hofmann–Wellenhof, B., et al, GPS Theory and Practice, NY: Springer–Verlag, 1993.

Hwang, P. Y. and Brown, R. G., GPS Navigation: Combining Pseudorange with Continuous Carrier Phase Using a Kalman Filter, Navigation: J. of the Inst. of Navigation, vol. 37, No. 2, Summer 1990, pp. 175–190.

"Enhanced Differential GPS Carrier–Smoother Code Processing Using Dual Frequency Measurements," Proceedings of ION GPS–98, The 11$^{th}$ Int. Tech Meeting of the Satellite Div. of the Inst. of Navigation, Nashville, TN, Sep. 15–18, 1998, by P. Y. Hwang, G. A. McGraw and J. R. Bader.

Lommis, P., et al, "Correction Algorithms for Differential GPS Reference Stations," Navigation: J. of Inst. of Navigation, vol. 36, No. 2, Summer 1989, pp. 91–105.

* cited by examiner

ENHANCED DIFFERENTIAL GNSS CARRIER-SMOOTHED CODE PROCESSING USING DUAL FREQUENCY MEASUREMENTS

CROSS REFERENCE TO RELATED APPLICATIONS

Reference is made to a co-pending and commonly assigned application, entitled METHOD TO IMPROVE CARRIER SMOOTHING OF CODE PSEUDORANGE FOR GLOBAL POSITIONING AND GNSS RECEIVER IMPLEMENTING THE SAME, by Patrick Hwang, identifiable by 09/277,310 and incorporated herein by reference.

FIELD OF THE INVENTION

The present invention relates to spread spectrum global navigation system receivers such as global positioning system (GPS) receivers. More particularly, the present invention relates to differential GPS (DGPS) base stations and receivers which implement methods of carrier smoothing code pseudorange measurements.

BACKGROUND OF THE INVENTION

The article, "Enhanced Differential GPS Carrier-Smoothed Code Processing Using Dual Frequency Measurements," Proceedings of ION GPS-98, The 11$^{th}$ Int. Tech. Meeting of the Satellite Div. of the Inst. of Navigation, Nashville, Tenn., Sept. 15–18, 1998, by P. Y. Hwang, G. A. McGraw and J. R. Bader, is herein incorporated by reference.

Global navigational satellite systems (GNSS) are known and include the global positioning system (GPS) and the Russian global orbiting navigational satellite system (GLONASS). GNSS-based navigational systems are used for navigation and positioning applications. In the GPS navigational system, GPS receivers receive satellite positioning signals from a set of up to 32 satellites deployed in 12-hour orbits about earth and dispersed in six orbital planes at an altitude of 10,900 nautical miles. Each GPS satellite continuously transmits two spread spectrum, L-band signals: an L1 signal having a frequency $f_{L1}$ of 1575.42 MHz, and an L2 signal having a frequency $f_{L2}$ of 1227.6 MHz. The L1 signal from each satellite is modulated by two pseudo-random codes, the coarse acquisition (C/A) code and the P-code. The P-code is normally encrypted, with the encrypted version of the P-code referred to as the Y-code. The L2 signal from each satellite is modulated by the Y-code. The C/A code is available for non-military uses, while the P-code (Y-code) is reserved for military uses.

GPS navigational systems determine positions by timing how long it takes the coded radio GPS signal to reach the receiver from a particular satellite (e.g., the travel time). The receiver generates a set of codes identical to those codes (e.g., the Y-code or the C/A-code) transmitted by the satellites. To calculate the travel time, the receiver determines how far it has to shift its own codes to match the codes transmitted by the satellites. The determined travel times for each satellite are multiplied by the speed of light to determine the distances from the satellites to the receiver. By receiving GPS signals from four or more satellites, a receiver unit can accurately determine its position in three dimensions (e.g., longitude, latitude, and altitude). A conventional GPS receiver typically utilizes the fourth satellite to accommodate a timing offset between the clocks in the receiver and the clocks in the satellites. Additional satellite measurements can be used to improve the position solution.

Differential GPS (DGPS) utilizes a base station located at a known position and one or more remote GPS receivers. The base station receives GPS positioning signals from the satellites and calculates predicted measurements based upon the known base station location. Based upon differences between the predicted base station measurements and the actual measurements, the base station transmits corrections to the remote GPS receiver. The remote GPS receiver uses the corrections and received GPS satellite signals to calculate its position more accurately.

Differential GPS architectures may be divided into two broad classes, local area and wide area. While variations in the ionospheric refraction (iono for short) are a major concern over the larger spatial domains covered by wide-area architectures, they are generally ignored in local-area systems since the iono component is strongly correlated over the smaller domains they cover. However, time variations in the iono do affect the smoothing of measurement noise, which is an aspect not always dealt with satisfactorily in local-area systems.

The technique of combining GPS code and carrier pseudorange information in a complementary filter to attenuate code multipath and tracking noise is known and is the basis for high-accuracy local-area code differential GPS systems, such as the FAA's Local Area Augmentation System (LAAS). A well-known limitation to this carrier smoothing processing technique is divergence in the iono refraction between code and carrier, which gives rise to a residual ranging error that is proportional to the smoothing filter time constant. Thus, in such code differential GPS systems, there is a trade-off between the iono-induced smoothing error and the amount of attenuation that can be achieved of slowly-varying code errors such as multipath. The current LAAS concept compensates for the iono divergence smoothing error by requiring that the reference and airborne receivers use the same steady state smoothing time constant, but this has adverse implications for continuity of function and availability.

SUMMARY OF THE INVENTION

A method of generating a differentially corrected pseudorange residual in a differential global positioning system includes tracking at a base station first and second GPS signals, having first and second frequencies, from a first satellite. At the base station, a first pseudorange measurement is determined from the tracked first GPS signal. At the base station, a first smoothed pseudorange measurement is calculated from the determined first pseudorange measurement as a function of both the first and second GPS signals. Corrections derived from the first smoothed pseudorange measurement are provided to a remote GPS receiver. The remote GPS receiver calculates a smoothed differentially corrected pseudorange residual as a function of the corrections provided by the base station.

DETAILED DESCRIPTION OF THE PREFERRED EMBODIMENTS

The present invention includes methods for utilizing dual-frequency GPS data to improve the accuracy of carrier-smoothed code pseudorange measurements in a DGPS. With these techniques, the steady state time constant used in the smoothing filter can be vastly extended as long as continuous carrier tracking is maintained. As used in this disclosure and in the attached claims, the terms GPS and DGPS are intended to include the present GNSS known as "the GPS", as well as all other current and future GNSS.

As used herein, the subscripts 1 and 2 of a term are used to indicate the L-band frequency associated with the term. For example, $\rho_1$ is used to represent L1 pseudorange and $\eta_{\rho 1}$ is used for L1 code multipath and tracking noise. Any term without this subscript designation is considered common to the two frequencies. Any term using a particular subscript shares a common definition with the term using the alternate subscript, as altered to indicate the L-band frequency referred to. Also, any term with a superscript "A" refers to a value or parameter determined ultimately from the L1 and/or L2 signals received at a remote DGPS receiver. Any term with a superscript "B" refers to a value or parameter determined ultimately from the L1 and/or L2 signals received at the DGPS base station. Any term with both a superscript "A" and a subscript "B" refers to a value or parameter determined ultimately from a combination of the signals received at the base station and the signals received at the remote receiver.

Figure 1:
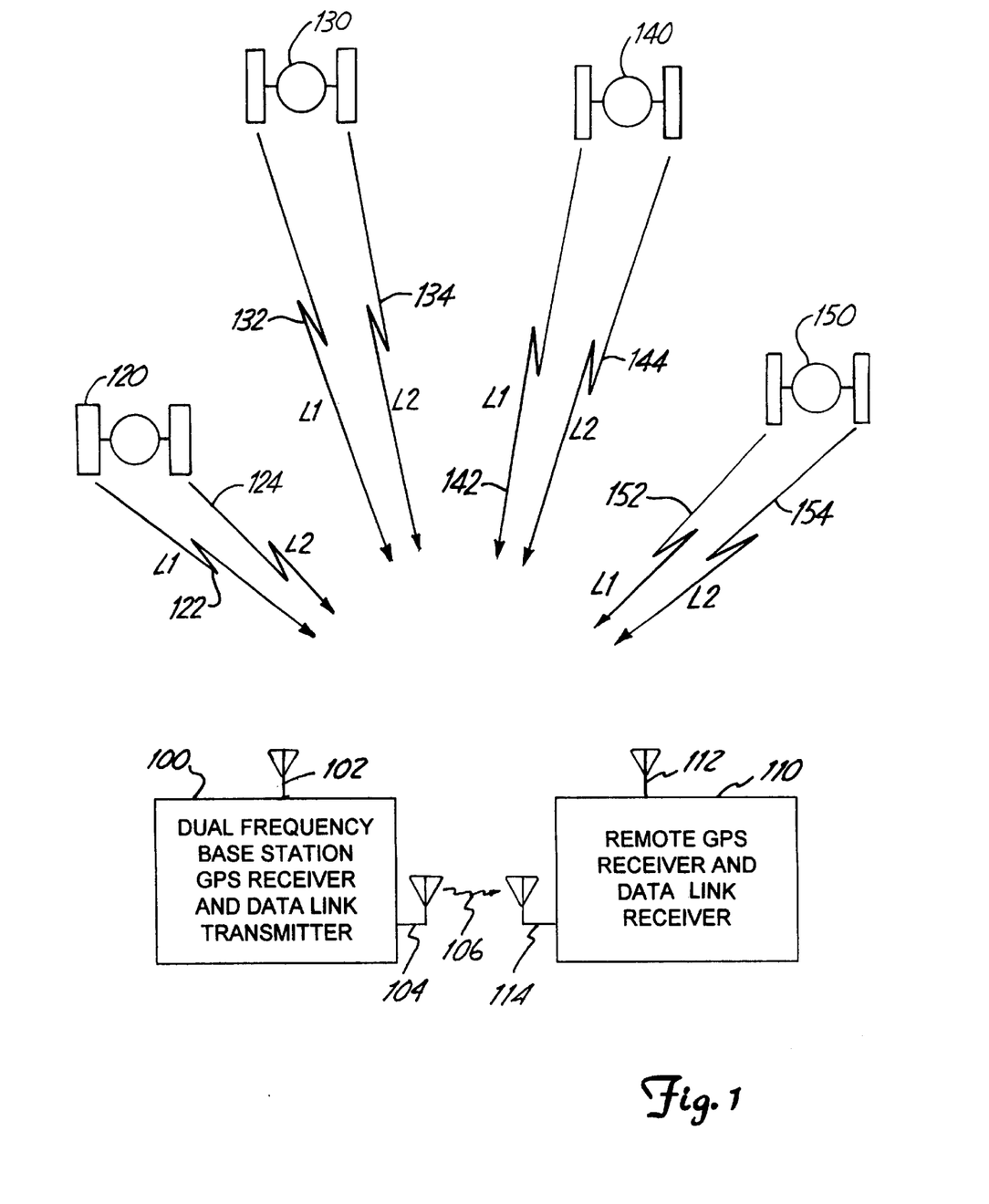
FIG. 1 is a diagrammatic illustration of a dual frequency DGPS base station and a remote DGPS receiver adapted to implement the code pseudorange measurement smoothing techniques of the present invention.

FIG. 1 is a block diagram of dual frequency DGPS base station 100 and a remote DGPS receiver 110 operating in an environment in which they receive at antennas 102 and 112 both L1 and L2 global positioning signals from multiple satellites. As illustrated, satellite 120 transmits L1 positioning signal 122 and L2 positioning signal 124. Satellite 130 transmits L1 positioning signal 132 and L2 positioning signal 134. Satellite 140 transmits L1 positioning signal 142 and L2 positioning signal 144. Satellite 150 transmits L1 positioning signal 152 and L2 positioning signal 154. Typically, positioning signals from other "visible" GPS satellites will also be received by antennas 102 and 112 of base station 100 and remote receiver 110. Dual frequency GPS base station 100 implements dual frequency carrier smoothing methods to improve the accuracy of the smoothed pseudorange measurements. The dual frequency carrier smoothed pseudorange correction information is transmitted from base station 100 to remote receiver 110 via uplink 106. As illustrated, uplink 106 is a radio communications link between the base station and remote receiver established using antennas 104 and 114. However, other types of uplinks which are known in the art can be used.

Figure 2:
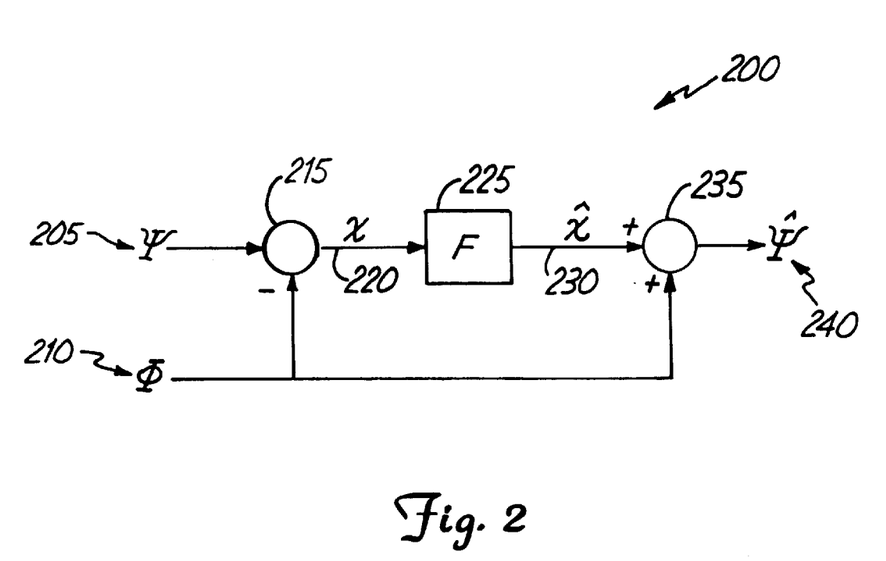
FIG. 2 is a block diagram illustrating carrier-smoothed code processing in accordance with the present invention.

The L1 code and carrier signals from a satellite can be modeled as shown in Equations 1 and 2:

$$\rho_1 = r + \iota_1 + \eta_{\rho 1} \qquad \text{Equation 1}$$

$$\phi_1 = r - \iota_1 + N_1 + \eta_{\phi 1} \qquad \text{Equation 2}$$

where, $\rho_1$=L1 code pseudorange measurement r=true geometric range, plus other range errors common to pseudorange and carrier phase, including SV clock and ephemeris errors, SA errors and tropospheric errors $\iota_1$=L1 iono refraction $\eta_{\rho 1}$=L1 code-tracking noise and multipath $\phi_1$=L1 carrier phase measurement $N_1$=range ambiguity for the L1 carrier $\eta_{\phi 1}$=L1 carrier-tracking noise and multipath The L2 code and carrier signals are similarly modeled. The goal of carrier smoothing is to produce a pseudorange measurement with code tracking noise and multipath suppressed. Among the many ways this can be accomplished is with complementary filter 200, as shown in FIG. 2. Filter 200 is implemented by DGPS base station 100 and DGPS remote receiver 110 in hardware, firmware or software. The filter input $\Psi$ 205 represents a generalized code pseudorange measurement. The filter input $\Phi$ 210 represents a generalized carrier phase measurement. Inputs 205 and 210 are differenced at differencing node 215 to produce differenced data or signal $\chi$ 220. Differenced data $\chi$ 220 is then filtered using filter 225 to remove unwanted components, for example code tracking noise and multipath. The filtered output data or signal $\chi$ is then recombined with the input $\Phi$ 210 at summing node 235 to form complimentary filter output $\hat{\Psi}$ 240, which represents the smoothed code measurement.

Some conventional single frequency carrier smoothing techniques simply use the L1 code pseudo-range measurement $\rho_1$ for $\Psi$ and the L1 carrier phase measurement $\phi_1$ for $\Phi$. The difference signal $\chi$ (code-minus-carrier or CMC) is typically filtered by a low-pass filter 225 to attenuate the code noise and multipath. The ultimate usefulness of complementary filter output $\hat{\Psi}$ 240 is dependent on the characteristics of the residual iono term. Temporal variations in the ionospheric delay, referred to as iono divergence, occur due to the satellite signal passing through different parts of the ionosphere, as well as due to changes in the ionosphere itself. The carrier smoothing filter can introduce an error in the presence of iono divergence, the size of which is proportional to the smoothing time constant $\tau$. For a typical value of iono divergence of 0.1 m/min and 100 sec smoothing time constant, the offset is about 33 cm, which would be a non-negligible error in many applications. During a severe ionospheric storm, the divergence can be 5–7 times as large.

Figure 3:
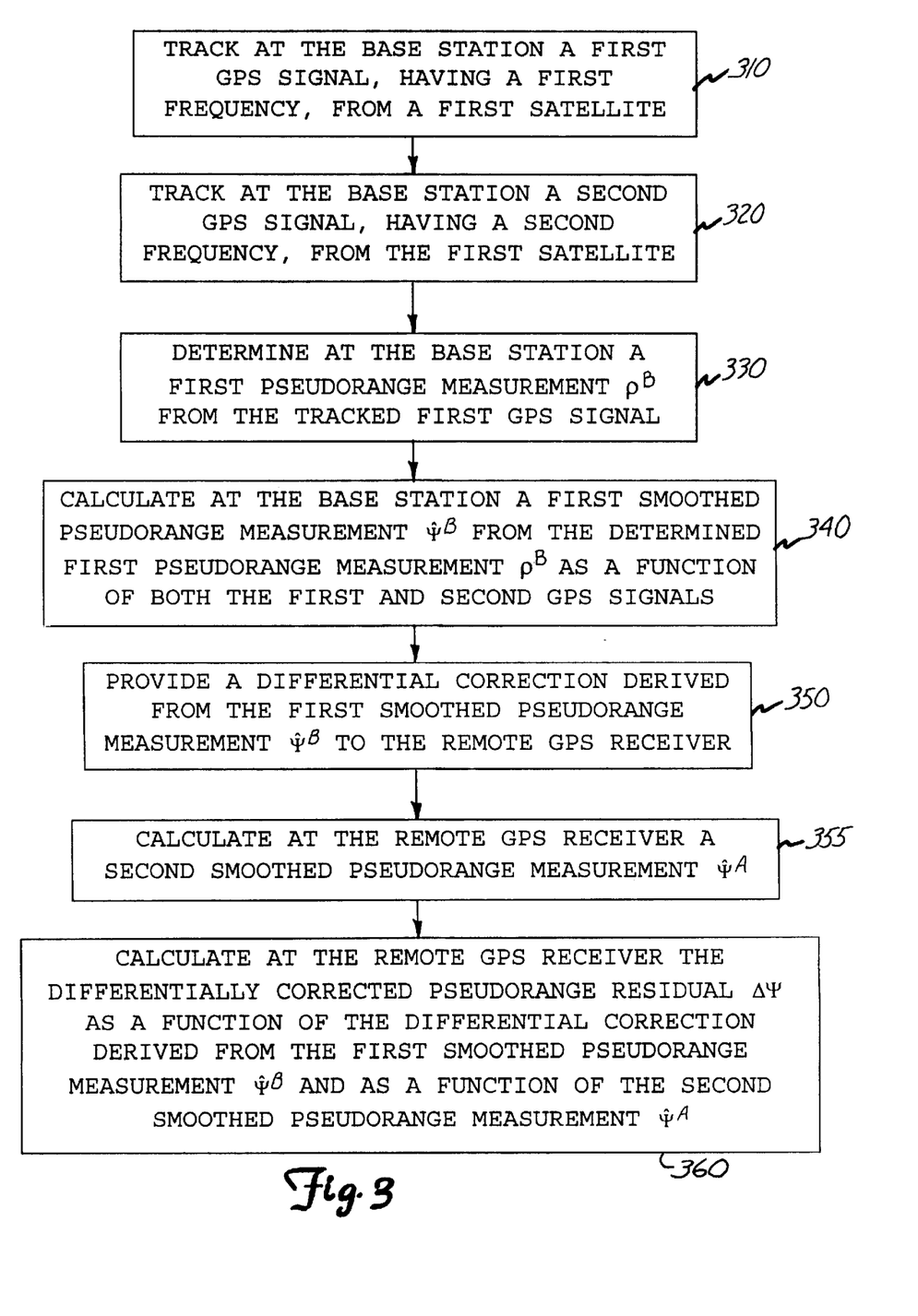
FIG. 3 is a flow diagram illustrating a method of carrier smoothing in a DGPS in accordance with the present invention.

At least one of dual frequency DGPS base station 100 and DGPS remote receiver 110 are adapted to implement dual-frequency carrier smoothing techniques. The dual frequency carrier smoothing techniques of the invention take advantage of the dual-frequency measurements made by receiver 110 and/or base station 100 to remove the effects of iono divergence in the smoothing process. FIG. 3 is a flow diagram which illustrates methods of the present invention. As shown at blocks 310 and 320, first and second GPS signals having first and second respective frequencies are tracked at base station 100. Next, as shown at block 330, first pseudorange measurement $\rho^B$ is determined at the base station from the tracked first GPS signal. As discussed with reference to FIG. 3, parameters such as pseudorange measurement $p_B$ are intended to be generic and can represent either L1 signal parameters or measurements or L2 signal parameters or measurements.

Next, as illustrated at block 340, a first smoothed pseudorange measurement $\hat{\Psi}^B$ is calculated at the base station from the determined first pseudorange measurement $\rho^B$. The smoothing is a function of both of the first and second GPS signals. Then, as illustrated at block 350, the first smoothed pseudorange measurement $\hat{\Psi}^B$ is used to compute DGPS corrections that are provided to the remote DGPS receiver 110. As illustrated at block 355, the remote DGPS receiver calculates a smoothed pseudorange measurement $\hat{\Psi}^A$ from the satellite signals received at the remote receiver. Finally as illustrated at block 360, the remote receiver calculates the differentially corrected pseudorange residual $\Delta\Psi$ as a function of the first smoothed pseudorange measurement $\hat{\Psi}^B$ provided by the base station and as a function of the second smoothed pseudorange measurement $\hat{\Psi}^A$ calculated by the remote receiver.

More specific embodiments of the general method illustrated in FIG. 3 are discussed below in greater detail. The more specific embodiments include dual and single frequency smoothing techniques implemented at remote receiver 110 using the dual frequency smoothed pseudorange measurement provided by base station 100. The dual-frequency smoothing techniques discussed below rely on the fact that iono refraction can be accurately modeled as inversely related to the square of the GPS frequency. Thus the following relationships shown in Equations 3 and 4 can be derived:

$$t_1 - t_2 = \left(1 - \frac{f_{L1}^2}{f_{L2}^2}\right) t_1 \equiv \alpha t_1 \qquad \text{Equation 3}$$

$$t_2 - t_1 = \left(1 - \frac{f_{L2}^2}{f_{L1}^2}\right) t_2 \equiv \beta t_2 \qquad \text{Equation 4}$$

Divergence-free smoothing of the L1 pseudorange can be accomplished by designating the complementary filter inputs in FIG. 2 using the relationships shown in Equations 5 and 6.

$$\Psi = \rho_1 \qquad \text{Equation 5}$$

$$\Phi = \phi_1 - 2/\alpha(\phi_1 - \phi_2) \qquad \text{Equation 6}$$

Using these definitions for the filter inputs, $\chi$ contains no jono terms. Therefore iono divergence will not affect the smoothing processing. As with conventional carrier smoothing, the error will be dominated by the L1 code tracking noise and multipath, since only insignificant carrier phase noise terms have been added in the processing. Then, $\chi$ can be filtered without any limitations on the smoothing constant, as long as the L1 and L2 carrier phase tracking are continuous so that there is no change in $N_1$ and $N_2$. The smoothed pseudorange contains the same iono refraction as the raw pseudorange. The residual smoothing error, is dominated by tracking noise and multipath associated with $\rho_1$. Thus the residual noise and multipath error will be approximately the same as with the conventional smoothing error.

Following a development analogous to that done for L1 divergence-free smoothing, a divergence-free L2 smoothed pseudorange can be obtained by defining the inputs to filter 200 using Equations 7 and 8:

$$\Psi = \rho_2 \qquad \text{Equation 7}$$

$$\Phi = \phi_2 - 2/\beta(\phi_2 - \phi_1) \qquad \text{Equation 8}$$

To illustrate the validity of the dual-frequency smoothing concept discussed above, a data set of code and carrier phase measurements made simultaneously at L1 and L2 were processed. The plots in FIGS. 4 and 5 illustrate the iono divergence trend seen in the prior art single-frequency case, and its removal in the divergence free dual-frequency cases.

Figure 4:
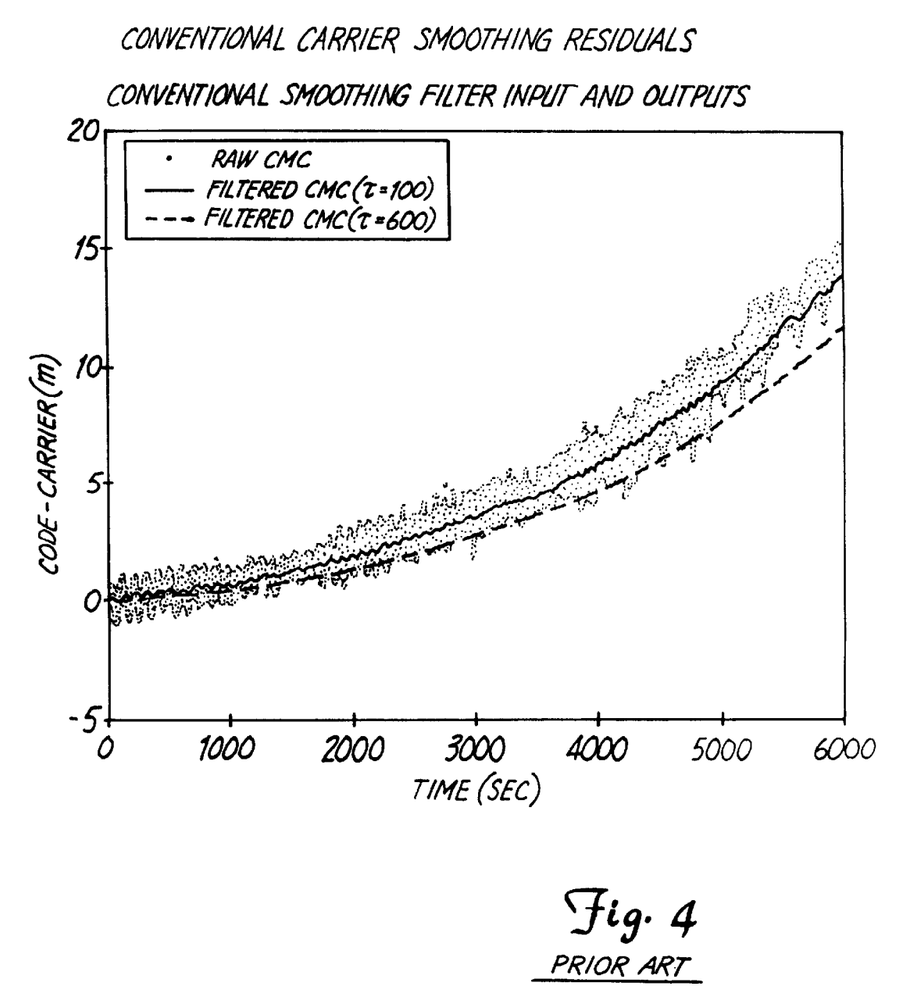
FIG. 4 is a plot illustrating the input and output of a prior art smoothing filter.

FIG. 4 shows the conventional single frequency case. Plotted are the raw CMC and filtered CMC ($\chi$ and $\hat{\chi}$), with filter time constants of 100 and 600 seconds. The initial value of the raw CMC data series was shifted to zero for plotting purposes. Over the 100-minute observation period the total iono delay changes about 7 m (CMC contains twice the iono delay). The 100 s time constant case yields a smoothed CMC that exhibits residual multipath errors. On the other hand, the 600 s time constant filter eliminates practically all multipath error oscillation is. In both cases, there are noticeable offsets when the iono divergence is large near the end of the observation interval. The offset for the 600 s case is about 2.9 m.

Figure 5:
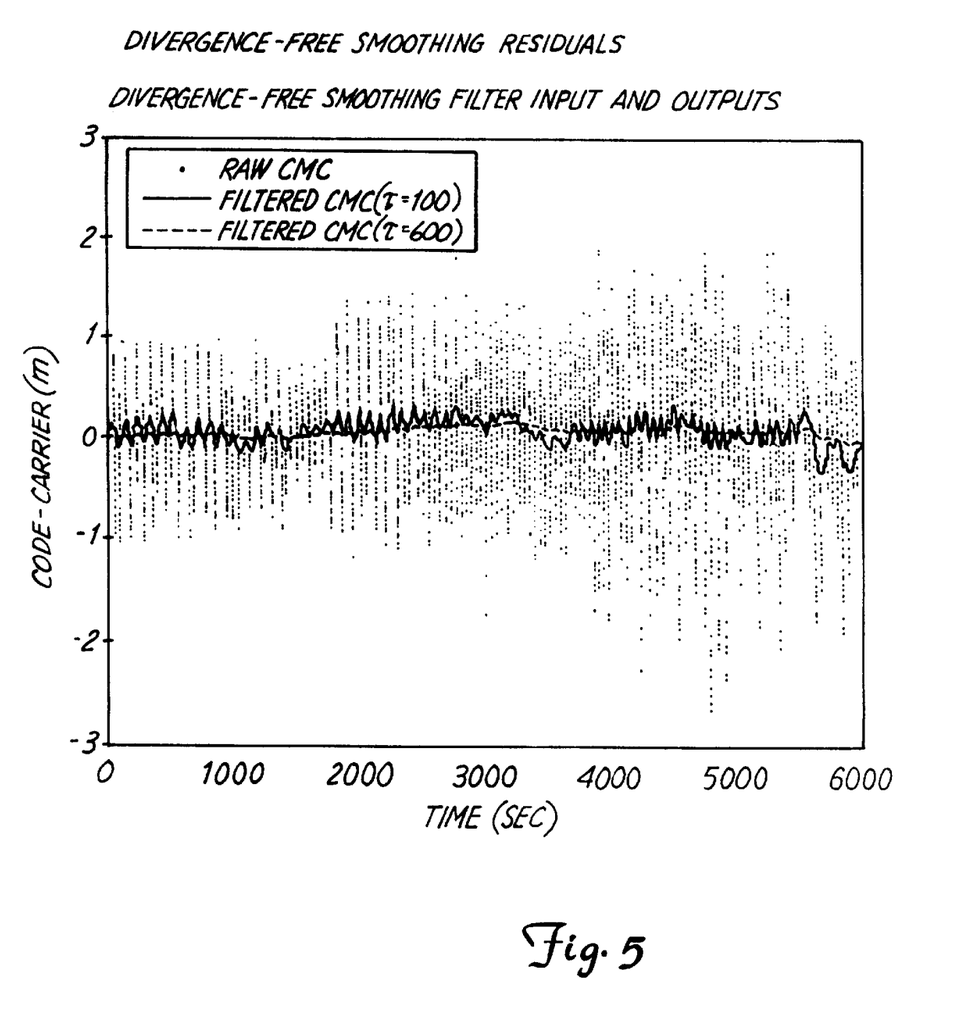
FIG. 5 is a plot illustrating the input and output of a divergence-free smoothing filter of the present invention.

The residuals plotted in FIG. 5 are for the divergence-free smoothing technique, corresponding to smoothing using the code and carrier inputs to filter 200 defined in Equations 5 and 6 (or Equations 7 and 8). The iono divergence is removed from the raw CMC and both filtered CMC signals track the long-term behavior of the raw signal, which demonstrates the potential for using extremely long smoothing time constants.

Figure 6:
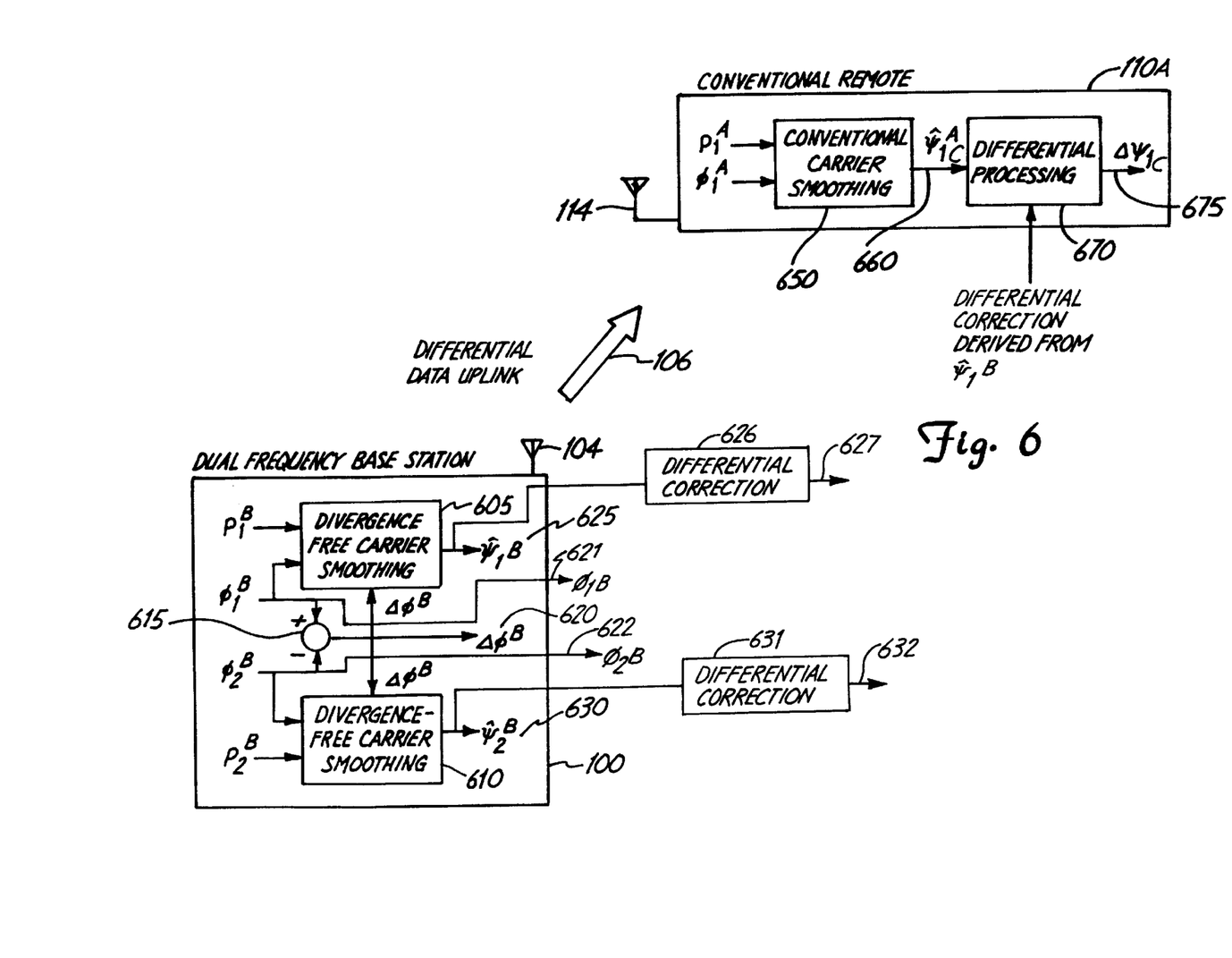
FIG. 6 is a block diagram illustrating the dual frequency base station and a conventional single frequency remote DGPS receiver.
Figure 7:
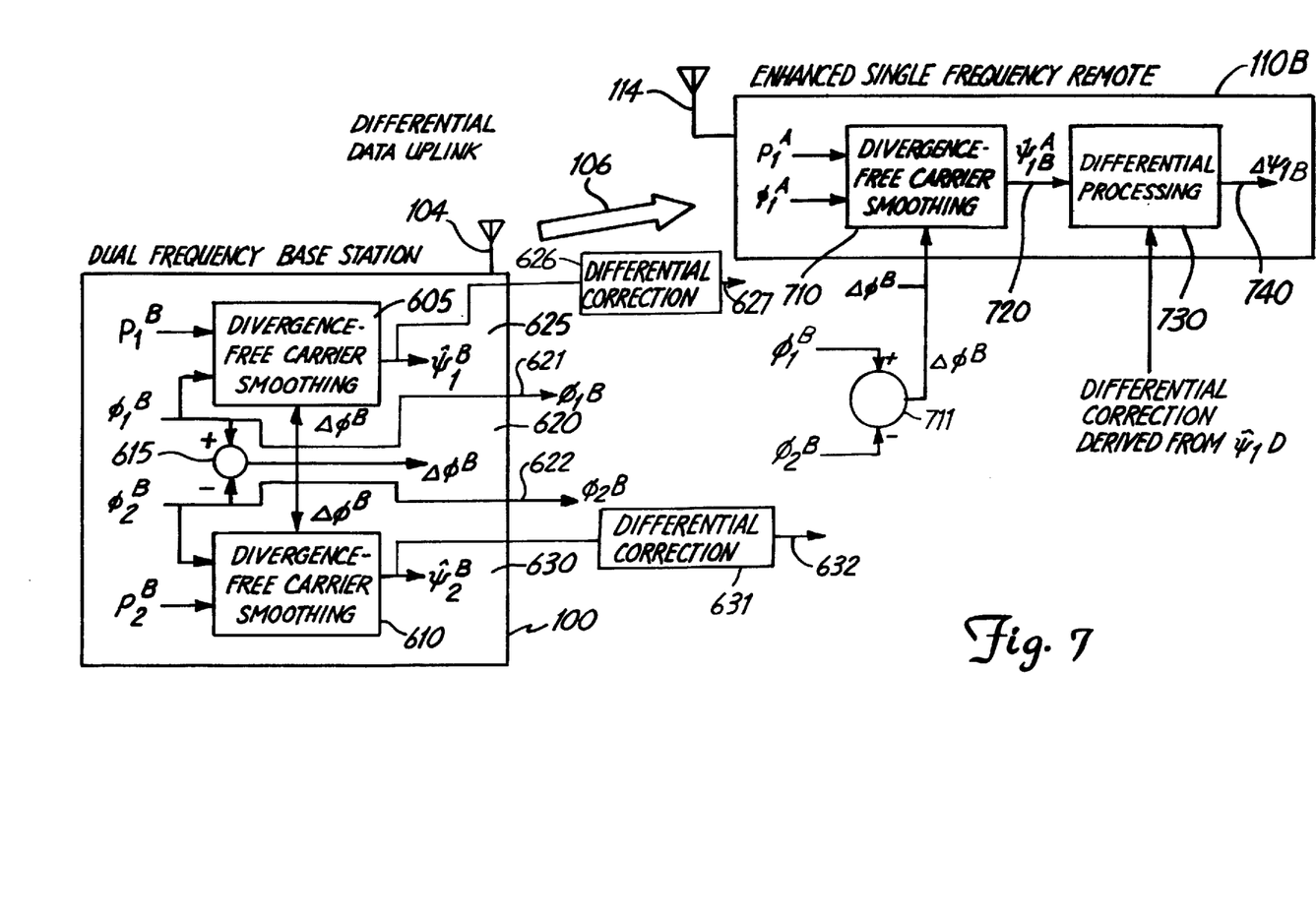
FIG. 7 is a block diagram illustrating the dual frequency base station and an enhanced single frequency remote DGPS receiver.
Figure 8:
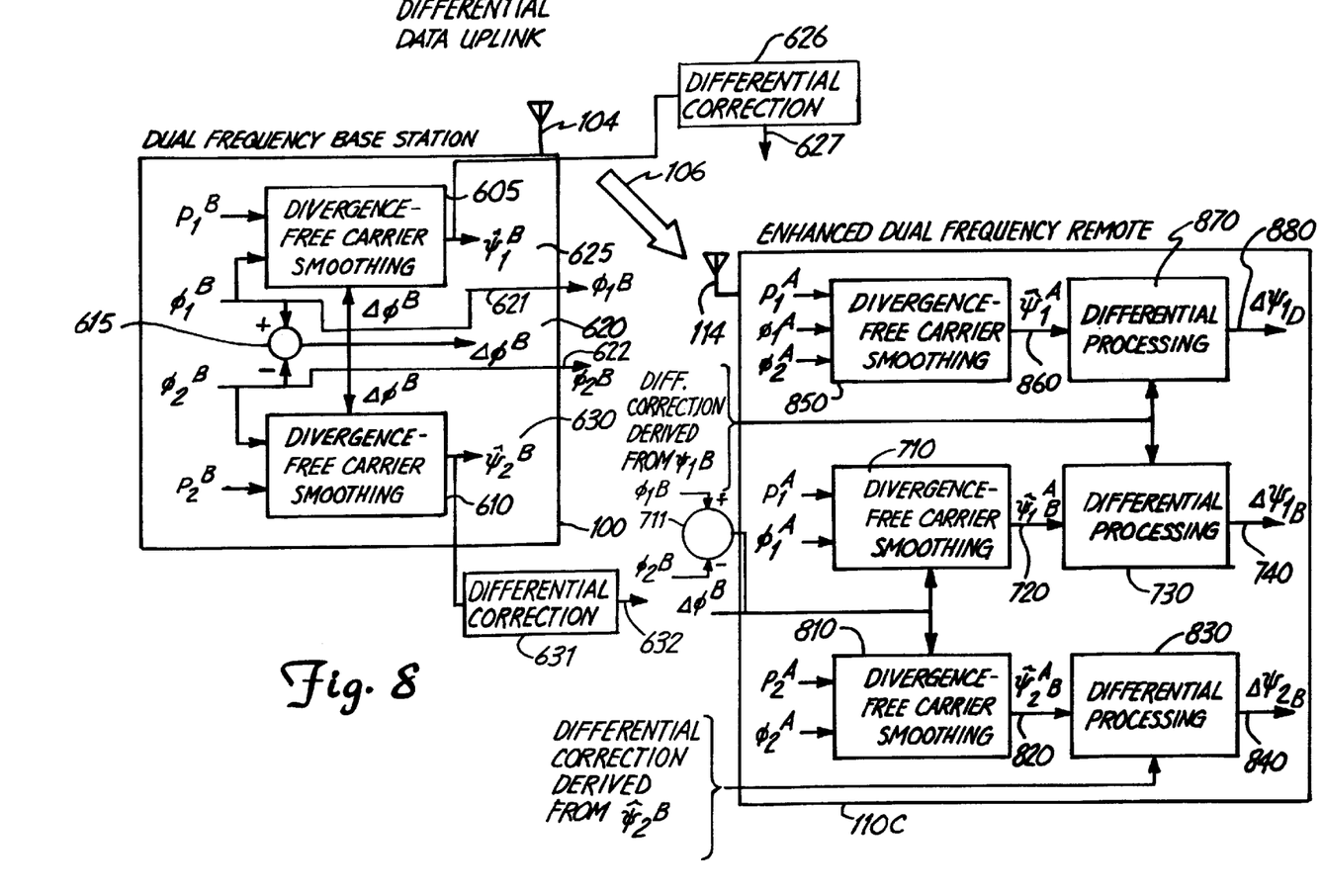
FIG. 8 is a block diagram illustrating the dual frequency base station and an enhanced dual frequency remote DGPS receiver.

The invention includes a new local-area DGPS architecture which addresses iono divergence using a dual-frequency receiver at differential base station 100. As illustrated in FIGS. 6–8, both single and dual frequency DGPS remote receivers can be used with dual frequency base station 100. As illustrated in these FIGS., base station 100 generates the smoothed pseudorange measurements $\hat{\Psi}_1^B$ and $\hat{\Psi}_2^B$ which can be used to generate differential corrections that are uplinked to the remote receivers for use in increasing the accuracy of the determined position of the remote receivers.

In various embodiments of the present invention, other information can be generated at the base station and transmitted or uplinked to the remote receivers for use in increasing the accuracy of the determined position. For example, in some embodiments, to permit remote users with single-frequency equipment to take advantage of the divergence-free smoothing performed in the base station, the base station determined L1–L2 phase difference, $\Delta\phi^B$, is included in the differential uplink L2 carrier phase measurements $\phi_1^B$ and $\phi_2^B$ may be uplinked separately. The base station determined L1–L2 phase difference $\Delta\phi^B$ can be written as:

$$\Delta\phi^B = \phi_1^B - \phi_2^B \qquad \text{Equation 9}$$

With this set of data generated at base station 100, three possible processing options for the remote user within the new architecture are discussed below. As illustrated, the same set of data is generated in all three embodiments of FIGS. 6–8. However, as will become evident, base station 100 need only generate the information used by the particular remote receiver configuration illustrated in a particular embodiment.

Base station 100 includes divergence free carrier smoothing filters 605 and 610 and differencing node 615. Differencing node 615 subtracts base station determined carrier phases $\phi_2^B$ from $\phi_1^B$ to produce $\Delta\phi^B$ at output 620. Carrier phase $\phi_1^B$ is available at output 621 and carrier phase $\phi_2^B$ is available at output 622. Filters 605 and 610 are substantially the same as filter 200 illustrated in FIG. 2. Filter 605 uses $\rho_1^B$, $\phi_1^B$ and $\Delta\phi^B$ to define the inputs to the filter using Equations 5 and 6. Smoothed pseudorange measurement $\hat{\Psi}_1^B$ is provided at output 625 of filter 605. Filter 610 uses $\rho_2^B$, $\phi_2^B$, and $\Delta\phi^B$ to define the inputs to the filter using Equations 7 and 8. Smoothed pseudorange measurement $\hat{\Psi}_2^B$ is provided at output 630 of filter 610. For ease of understanding, it is assumed here that one or both of the whole pseudorange value or corrections derived from $\hat{\Psi}_1^B$ and $\hat{\Psi}_2^B$ are transferred via uplink 106 in the differential correction message to the remote receiver. However, those skilled in the art will recognize that information other than the whole pseudorange values can be uplinked while still falling within the scope of the invention. or instance smoothed pseudorange measurement $\hat{\Psi}_1^B$ may be processed in differential correction block 626 and a differential correction may be supplied at output 627 and uplinked to the remote receiver as shown in block 350 of FIG. 3. Likewise smoothed pseudorange measurement $\hat{\Psi}_2^B$ may be processed in differential correction block 631 and a differential correction may be supplied at output 632 to uplink to the remote receiver.

As mentioned above, in various embodiments of the present invention, at least three different types of remote DGPS receivers can be utilized: (1) a conventional single frequency DGPS remote receiver; (2) an enhanced single frequency DGPS remote receiver; and (3) an enhanced dual frequency DGPS remote receiver.

Conventional Single Frequency Remote

FIG. 6 illustrates base station 100 in cooperation with a single frequency DGPS remote receiver 110A of a conventional configuration. In this case, remote receiver 110A includes conventional single frequency carrier smoothing filter 650 to provide at output 660 a smoothed pseudorange $\hat{\Psi}_{1C}^A$. To calculate smoothed pseudorange $\hat{\Psi}_{1C}^A$, filter 650 implements the function of filter 200 (shown in FIG. 2) using $\rho_1^A$ for $\Psi$ and $\phi_1^A$ for $\phi$. Differential processing circuitry 670 uses the dual frequency smoothed pseudorange measurement data $\hat{\Psi}_1^B$ or a differential correction derived from the dual frequency smoothed pseudorange measurement $\hat{\Psi}_1^B$ received over uplink 106 and the single frequency smoothed pseudorange $\hat{\Psi}_{1C}^A$ to form at output 675 a differentially-corrected pseudorange residual $\Delta\Psi_{1C}$ which can be written:

$$\Delta\Psi_{1C} = \hat{\Psi}_{1C}^A - \hat{\Psi}_1^B \qquad \text{Equation 10}$$

Enhanced Single Frequency Remote

FIG. 7 illustrates base station 100 in cooperation with single frequency remote receiver 110B, which is similar to conventional receiver 110A illustrated in FIG. 6, but which uses some additional dual frequency information from base station 100 to produce the differentially corrected pseudorange residual $\Delta\Psi_{1B}$. In remote receiver 110B, divergence-free carrier smoothing filter 710 is included to provide at output 720 a smoothed pseudorange $\hat{\Psi}_{1B}^A$. Smoothed pseudorange $\hat{\Psi}_{1B}^A$ is calculated by combining single-frequency code $\rho_1^A$ and carrier $\phi_1^A$ measurements from the remote receiver with the base station determined carrier phase difference $\Delta\phi^B$ or the remote station determined phase difference from $\phi_1^B$ and $\phi_2^B$ received via uplink 106. A differencing node 711 may be used in the remote receiver 110B to determine the carrier phase difference $\Delta\phi^B$ from the base station determined carrier phases $\phi_1^B$ and $\phi_2^B$. To calculate smoothed pseudorange $\hat{\Psi}_{1B}^A$, filter 710 implements the function of filter 200 (shown in FIG. 2) with the generalized code and carrier inputs $\Psi$ and $\Phi$ defined as shown in Equations 11 and 12:

$$\Psi = \rho_1^A \qquad \text{Equation 11}$$

$$\Phi = \phi_1^A - 2/\alpha \Delta\phi^B \qquad \text{Equation 12}$$

Differential processing circuitry 730 uses smoothed pseudorange measurement data $\hat{\Psi}_1^B$ or may use a differential correction derived from the smoothed pseudorange measurement data $\hat{\Psi}_1^B$ received over uplink 106 and the smoothed pseudorange $\hat{\Psi}_{1B}^A$ to provide at output 740 the differentially-corrected pseudorange residual $\Delta\Psi_1$, which can be written:

$$\Delta\Psi_{1B} = \hat{\Psi}_{1B}^A - \hat{\Psi}_1^B \qquad \text{Equation 13}$$

Enhanced Dual Frequency Remote

FIG. 8 illustrates base station 100 in cooperation with dual-frequency remote receiver 110C. With dual frequency remote receiver 110C, three smoothed pseudorange outputs can be derived: (1) divergence-free smoothed L1 pseudorange $\hat{\Psi}_{1B}^A$ using base station or remote station derived carrier difference $\Delta\phi^B$; (2) divergence-free smoothed L2 pseudorange $\hat{\Psi}_{2B}^A$ using base station or remote station derived carrier difference $\Delta\phi^B$; and (3) divergence-free smoothed L1 pseudorange $\hat{\Psi}_1^A$ using remote receiver determined carrier difference $\Delta\phi^A$ ($\Delta\phi^A = \phi_1^A - \phi_2^A$). Determination of divergence-free smoothed L2 pseudorange $\hat{\Psi}_{2B}^A$ requires that L2 measurement $\hat{\Psi}_2^B$ or a differential correction derived from $\hat{\Psi}_2^B$ be transferred via uplink 106 from the base station to remote receiver 110C. Determination of divergence-free smoothed L2 pseudorange $\hat{\Psi}_{2B}^A$ makes receiver 110C more robust to any loss of L1 signals from interference or jamming.

Like single frequency receiver 110B (shown in FIG. 7), receiver 110C includes divergence free carrier smoothing filter 710 which calculates smoothed pseudorange $\hat{\Psi}_{1B}^A$, using Equations 11 and 12 to define generalized code and carrier inputs $\Psi$ and $\Phi$. Receiver 110C also includes differential processing circuitry 730 to provide a first differentially corrected pseudorange residual $\Delta\Psi_{1B}$ by implementing Equation 13.

Receiver 110C also includes divergence free carrier smoothing filter 810 to provide at output 820 a smoothed pseudorange $\hat{\Psi}_{2B}^A$. Smoothed pseudorange $\hat{\Psi}_{2B}^A$ is calculated by combining remote receiver determined single-frequency code $\rho_2^A$ and carrier $\phi_2^A$ measurements with the base station determined L1–L2 carrier phase difference $\Delta\phi^B$ received via uplink 106. A differencing node 711 may be used in the remote receiver 110C to determine the carrier phase difference $\Delta\phi^B$ from the base station determined carrier phases $\phi_1^B$ and $\phi_2^B$. To calculate smoothed pseudorange $\hat{\Psi}_{2B}^A$, filter 810 implements the function of filter 200 (shown in FIG. 2) with the generalized code and carrier inputs $\Psi$ and $\Phi$ defined as shown in Equations 14 and 15:

$$\Psi = \rho_2^A \qquad \text{Equation 14}$$

$$\Phi = \phi_2^A - 2/\alpha \Delta\phi^B \qquad \text{Equation 15}$$

Differential processing circuitry 830 uses smoothed L2 pseudorange measured data $\hat{\Psi}_2^B$ or a differential correction derived from $\hat{\Psi}_2{}^B$ received over uplink 106 and the smoothed pseudorange $\hat{\Psi}_{2B}{}^A$ to form at output 840 a differentially-corrected L2 pseudorange residual $\Delta\Psi_2$, which can be written:

$$\Delta\Psi_{1B}=\hat{\Psi}_{2B}{}^A-\hat{\Psi}_2{}^B \qquad \text{Equation 16}$$

Receiver 110C also includes divergence free carrier smoothing filter 850 to provide at output 860 smoothed L1 pseudorange $\hat{\Psi}_1{}^A$ using remote receiver determined carrier difference $\Delta\phi^A$. Differential processing circuitry 870 uses smoothed L1 pseudorange measurement data $\hat{\Psi}_1{}^B$ or a differential correction derived from $\hat{\Psi}_1{}^B$ received over uplink 106 and the smoothed pseudorange $\hat{\Psi}_1{}^A$ to form at output 880 a second differentially-corrected L1 pseudorange residual $\Delta\Psi_1$, which can be written:

$$\Delta\Psi_{1D}=\hat{\Psi}_1{}^A-\hat{\Psi}_1{}^B \qquad \text{Equation 17}$$

If desired, a second differentially corrected L2 pseudorange residual can be calculated using a filter similar to filter 850, but adapted to produce an L2 pseudorange residual. Of the differentially corrected pseudorange residuals which can be produced by receiver 110C, the best performance is expected to come from filter 850 and differential processing circuitry 870 under normal operating conditions when the remote determined L1 pseudorange $\rho_1{}^A$ and the L1 and L2 carrier phases $\phi_1{}^A$ and $\phi_2{}^A$ are available. The residual iono error in this case does not include airborne filter transient as in the enhanced single frequency case, but the iono spatial decorrelation, noise, and multipath errors will be approximately the same.

With interference or jamming where tracking continuity in the L1 and L2 carrier phase cannot both be sustained, a reversion to case 1 (filter 710 and differential processing circuitry 730) or to case 2 (filter 810 and differential processing circuitry 830) is made, relying on the dual frequency carrier phase information from the base station.

Although the present invention has been described with reference to preferred embodiments, workers skilled in the art will recognize that changes may be made in form and detail without departing from the spirit and scope of the invention. For example, while the present invention is described and claimed primarily with reference to the GPS navigational system, it can be used with and applies to other existing and future GNSS as well. Further, while the two frequencies referred to herein are the L1 and L2 GPS satellite frequencies, other frequencies can be used instead. Also, throughout the description and claims, references to "measurements" being calculated, provided, uplinked or otherwise used are to be interpreted to include the described uses of portions of the measurements, differential corrections derived from the measurements and/or other data representative of the informational content of the measurements.

What is claimed is:

1. A method of generating a differentially-corrected divergence-free carrier-smoothed pseudorange residual in a differential global positioning system, the method comprising:

tracking at a dual frequency base station a first GPS signal, having a first frequency, from a first satellite;

tracking at the base station a second GPS signal, having a second frequency, from the first satellite;

determining at the base station a first pseudorange measurement $\rho_1{}^B$ from the tracked first GPS signal;

determining at the base station a first carrier phase measurement $\phi_1{}^B$ from the tracked first GPS signal;

determining at the base station a second carrier phase measurement $\phi_2{}^B$ from the tracked second GPS signal;

calculating at the base station a phase difference $\Delta\phi^B$ between the first carrier phase measurement $\phi_1{}^B$ and the second carrier phase measurement $\phi_2{}^B$;

calculating at the base station a first divergence-free carrier-smoothed pseudorange measurement $\hat{\Psi}_1{}^B$ from the first pseudorange measurement $\rho_1{}^B$, the first carrier phase measurement $\phi_1{}^B$, and the phase difference $\Delta\phi^B$;

deriving at the base station a differential correction from the first divergence-free carrier-smoothed pseudorange measurement $\hat{\Psi}_1{}^B$;

providing the differential correction derived from the first divergence-free carrier-smoothed pseudorange measurement $\hat{\Psi}_1{}^B$ to a remote GPS receiver;

providing the first carrier phase measurement $\phi_1{}^B$ and the second carrier phase measurement $\phi_2{}^B$ or the phase difference $\Delta\phi^B$ to the remote GPS receiver; and calculating at the remote GPS receiver the differentially-corrected divergence-free carrier smoothed-pseudorange residual.

2. The method of claim 1 wherein the step of calculating at the base station the first divergence-free carrier smoothed pseudorange measurement $\hat{\Psi}_1{}^B$ further comprises:

subtracting the phase difference $\Delta\phi^B$ from the first carrier phase measurement $\phi_1{}^B$ to obtain a generalized carrier phase measurement $\Phi$;

subtracting the generalized carrier phase measurement $\Phi$ from the first pseudorange measurement $\rho_1{}^B$ to obtain a differenced data signal $\chi$;

filtering the differenced data signal $\chi$ to obtain a filtered output data signal $\hat{\chi}$; and adding the generalized carrier phase measurement $\Phi$ to the filtered output data signal $\hat{\chi}$ to obtain the first divergence-free carrier smoothed pseudorange measurement $\hat{\Psi}_1{}^B$.

3. The method of claim 1 and further comprising:

determining at the dual frequency base station a second pseudorange measurement $\rho_2{}^B$ from the tracked second GPS signal;

calculating at the base station a second divergence-free carrier-smoothed pseudorange measurement $\hat{\Psi}_2{}^B$ from the second pseudorange measurement $\rho_2{}^B$, the second carrier phase measurement $\phi_2{}^B$, and the phase difference $\Delta\phi^B$;

deriving a differential correction from the second divergence-free carrier-smoothed pseudorange measurement $\hat{\Psi}_2{}^B$;

providing the differential correction derived from the second divergence-free carrier-smoothed pseudorange measurement $\hat{\Psi}_2{}^B$ to a remote GPS receiver; and calculating at the remote GPS receiver the differentially-corrected divergence-free carrier-smoothed pseudorange residual.

4. The method of claim 1 wherein the remote GPS receiver is a conventional GPS receiver, the method at the conventional remote GPS receiver further comprising:

tracking the first GPS signal;

determining a first pseudorange measurement $\rho_1{}^A$ from the tracked first GPS signal;

determining a first carrier phase measurement $\phi_1{}^A$ from the tracked first GPS signal;

calculating a first smoothed pseudorange measurement $\hat{\Psi}_{1C}{}^A$ from the first pseudorange measurement $\rho_1{}^A$ and the first carrier phase measurement $\phi_1{}^A$; and calculating a differentially-corrected pseudorange residual $\Delta\Psi_{1C}$ as a function of a difference between the first smoothed pseudorange measurement $\hat{\Psi}_{1C}{}^A$ and the differential correction derived from the first divergence-free carrier-smoothed pseudorange measurement $\hat{\Psi}_1{}^B$.

5. The method of claim 1 wherein the remote GPS receiver is an enhanced single frequency GPS receiver, the method at the enhanced remote GPS receiver further comprising:

tracking the first GPS signal;

determining a first pseudorange measurement $\rho_1{}^A$ from the tracked first GPS signal;

determining a first carrier phase measurement $\phi_1{}^A$ from the tracked first GPS signal;

calculating a first divergence-free carrier-smoothed pseudorange measurement $\hat{\Psi}_{1B}{}^A$ from the first pseudorange measurement $\rho_1{}^A$, the first carrier phase measurement $\phi_1{}^A$, and the phase difference $\Delta\phi^B$; and calculating a differentially-corrected pseudorange residual $\Delta\Psi_{1B}$ as a function of a difference between the first divergence-free carrier-smoothed pseudorange measurement $\hat{\Psi}_{1B}{}^A$ and the differential correction derived from the first divergence-free carrier-smoothed pseudorange measurement $\hat{\Psi}_1{}^B$.

6. The method of claim 1 wherein the enhanced single frequency remote GPS receiver calculates the phase difference $\Delta\phi^B$ between the first carrier phase measurement $\phi_1{}^B$ and the second carrier phase measurement $\phi_2{}^B$.

7. The method of claim 1 wherein the remote GPS receiver is an enhanced dual frequency GPS receiver, the method at the enhanced remote GPS receiver further comprising:

tracking the first GPS signal;

tracking the second GPS signal;

determining a first pseudorange measurement $\rho_1{}^A$ from the tracked first GPS signal;

determining a first carrier phase measurement $\phi_1{}^A$ from the tracked first GPS signal;

determining a second carrier phase measurement $\phi_2{}^A$ from the tracked second GPS signal;

calculating a first divergence-free carrier-smoothed pseudorange measurement $\hat{\Psi}_1{}^A$ from the first pseudorange measurement $\rho_1{}^A$, the first carrier phase measurement $\phi_1{}^A$, and the second carrier phase measurement $\phi_2{}^A$; and calculating a differentially-corrected pseudorange residual $\Delta\Psi_{1D}$ as a function of a difference between the first divergence-free carrier-smoothed pseudorange measurement $\hat{\Psi}_1{}^A$ and the differential correction derived from first divergence-free carrier-smoothed pseudorange measurement $\hat{\Psi}_1{}^B$.

8. The method of claim 3 wherein the remote GPS receiver is an enhanced dual frequency GPS receiver, the method at the enhanced remote GPS receiver further comprising:

tracking the second GPS signal;

determining a second pseudorange measurement $\rho_2{}^A$ from the tracked second GPS signal;

determining a second carrier phase measurement $\phi_2{}^A$ from the tracked second GPS signal;

calculating a second divergence-free carrier-smoothed pseudorange measurement $\hat{\Psi}_{2B}{}^A$ from the second pseudorange measurement $\rho_2{}^A$, the second carrier phase measurement $\phi_2{}^A$, and the phase difference $\Delta\phi^B$; and calculating a differentially-corrected pseudorange residual $\Delta\Psi_{2B}$ as a function of a difference between the second divergence-free carrier-smoothed pseudorange measurement $\hat{\Psi}_{2B}{}^A$ and the differential correction derived from second divergence-free carrier-smoothed pseudorange measurement $\hat{\Psi}_2{}^B$.

9. The method of claim 8 wherein the enhanced GPS receiver calculates the phase difference $\Delta\phi^B$ between the first carrier phase measurement $\phi_1{}^B$ and the second carrier phase measurement $\phi_2{}^B$.

10. A differential global positioning system for generating a differentially-corrected divergence-free carrier-smoothed pseudorange residual comprising:

a dual frequency base station for tracking from a GPS satellite a first signal at a first frequency and a second signal at a second frequency, said dual frequency base station further comprising:

a carrier phase differencing node for calculating a phase difference $\Delta\phi^B$ between a first carrier phase measurement $\phi_1{}^B$ of the first signal and a second carrier phase measurement $\phi_2{}^B$ of the second signal;

a divergence-free carrier smoothing filter for calculating a divergence-free carrier-smoothed pseudorange measurement $\hat{\Psi}_1{}^B$ from a first pseudorange measurement $\rho_1{}^B$ of the first signal, the first carrier phase measurement $\phi_1{}^B$, and the phase difference $\Delta\phi^B$;

a differential correction generator for calculating a differential correction derived from the divergence-free carrier-smoothed pseudorange measurement $\hat{\Psi}_1{}^B$; and a communications device for transmitting the first carrier phase measurement $\phi_1{}^B$ and the second carrier phase measurement $\phi_2{}^B$ or the phase difference $\Delta\phi^B$ and the differential correction derived from the divergence-free carrier-smoothed pseudorange measurement; and a remote GPS receiver for receiving over the communications device the first carrier phase measurement $\phi_1{}^B$ and the second carrier phase measurement $\phi_2{}^B$ or the phase difference $\Delta\phi^B$ and the differential correction derived from the divergence-free carrier-smoothed pseudorange measurement $\hat{\Psi}_1{}^B$ and for calculating the differentially-corrected divergence-free carrier-smoothed pseudorange residual.

11. The differential global positioning system of claim 10 wherein the dual frequency base station further comprises a second divergence-free carrier smoothing filter for calculating a second divergence-free carrier-smoothed pseudorange measurement $\hat{\Psi}_2{}^B$ from a second pseudorange measurement $\rho_2{}^B$ from the second signal, the second carrier phase measurement $\phi_2{}^B$, and the phase difference $\Delta\phi^B$.

12. The differential global positioning system of claim 11 wherein the dual frequency base station further comprises a second differential correction generator for calculating a second differential correction derived from the second divergence-free carrier-smoothed pseudorange measurement $\hat{\Psi}_2{}^B$.

13. The differential global positioning system of claim 12 wherein the communications device further provides the second differential correction derived from the second divergence-free carrier-smoothed pseudorange measurement $\hat{\Psi}_2{}^B$ to the remote GPS receiver.

14. The differential global positioning system of claim 10 wherein the remote GPS receiver is a conventional GPS receiver for tracking the first signal, said conventional GPS receiver further comprising:

a conventional carrier smoothing filter for calculating a first remote carrier-smoothed pseudorange measurement $\hat{\Psi}_{1C}^A$ from a first remote pseudorange measurement $\rho_1^A$ and a first remote carrier phase measurement $\phi_1^A$ from the first signal; and a differential processor for calculating a differentially-corrected pseudorange residual $\Delta\Psi_{1C}$ as a function of the first remote carrier-smoothed pseudorange measurement $\hat{\Psi}_{1C}^A$ and the differential correction derived from the first divergence-free carrier-smoothed pseudorange measurement $\hat{\Psi}_1^B$.

15. The differential global positioning system of claim 10 wherein the remote GPS receiver is an enhanced single frequency GPS receiver for tracking the first signal, said enhanced GPS receiver further comprising:

a divergence-free carrier smoothing filter for calculating a first remote divergence-free carrier-smoothed pseudorange measurement $\hat{\Psi}_{1B}^A$ from a first remote pseudorange measurement $\rho_1^A$ and a first remote carrier phase measurement $\phi_1^A$ of the first signal, and the phase difference $\Delta\phi^B$; and a differential processor for calculating a differentially-corrected pseudorange residual $\Delta\Psi_{1B}$ as a function of the first remote divergence-free carrier-smoothed pseudorange measurement $\hat{\Psi}_{1B}^A$ and the differential correction derived from the first divergence-free carrier-smoothed pseudorange measurement $\hat{\Psi}_1^B$.

16. The differential global positioning system of claim 15 wherein the enhanced GPS receiver further comprises a carrier phase differencing node for calculating the phase difference $\Delta\phi^B$ between the first carrier phase measurement $\phi_1^B$ of the first signal and the second carrier phase measurement $\phi_2^B$ of the second signal received from the uplink.

17. The differential global positioning system of claim 10 wherein the remote GPS receiver is an enhanced dual frequency GPS receiver for tracking the first signal and the second signal, said enhanced GPS receiver further comprising:

a divergence-free carrier smoothing filter for calculating a second remote divergence-free carrier-smoothed pseudorange measurement $\Psi_1^A$ from a first remote pseudorange measurement $\rho_1^A$ and a first remote carrier phase measurement $\phi_1^A$ from the first signal and a second remote carrier phase measurement $\phi_2^A$ from the second signal; and a differential processor for calculating a differentially-corrected pseudorange residual $\Delta\Psi_{1D}$ as a function of the second remote divergence-free carrier-smoothed pseudorange measurement $\hat{\Psi}_1^A$ and differential correction derived from the first divergence-free carrier-smoothed pseudorange measurement $\hat{\Psi}_1^B$.

18. The differential global positioning system of claim 13 wherein the remote GPS receiver is an enhanced dual frequency GPS receiver for tracking the second GPS signal, said enhanced GPS receiver further comprising:

a divergence-free carrier smoothing filter for calculating a third divergence-free carrier-smoothed pseudorange measurement $\hat{\Psi}_{2B}^A$ from a second remote pseudorange measurement $\rho_2^A$ and a second remote carrier phase measurement $\phi_2^A$ from the second signal and the phase difference $\Delta\phi^B$ between the first carrier phase measurement $\phi_1^B$ and the second carrier phase measurement $\phi_2^B$; and a differential processor for calculating a differentially-corrected pseudorange residual $\Delta\Psi_{2B}$ as a function of the third remote divergence-free carrier-smoothed pseudorange measurement $\hat{\Psi}_{2B}^A$ and differential correction derived from the second divergence-free carrier-smoothed pseudorange measurement $\hat{\Psi}_2^B$.

19. The differential global positioning system of claim 18 wherein the remote enhanced GPS receiver further comprises a carrier phase differencing node for calculating the phase difference $\Delta\phi^B$ between the first carrier phase measurement $\phi_1^B$ of the first signal and a second carrier phase measurement $\phi_2^B$ of the second signal received from the uplink.

* * * * *